(12) United States Patent
Fahrbach (10) Patent No.: US 11,709,137 B2
(45) Date of Patent: Jul. 25, 2023

(54) LIGHT SHEET FLUORESCENCE MICROSCOPE

(71) Applicant: Leica Microsystems CMS GmbH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 291 days.

(21) Appl. No.: 17/110,455

(22) Filed: Dec. 3, 2020

(65) Prior Publication Data

US 2021/0172876 A1    Jun. 10, 2021

(30) Foreign Application Priority Data

Dec. 5, 2019 (EP) .................................... 19213913

(51) Int. Cl.
*G02B 21/00* (2006.01)
*G01N 21/64* (2006.01)
*G02B 21/16* (2006.01)

(52) U.S. Cl.
CPC ....... *G01N 21/6458* (2013.01); *G01N 21/648* (2013.01); *G02B 21/16* (2013.01)

(58) Field of Classification Search
CPC .... G02B 21/16; G02B 21/00; G02B 21/0004; G02B 21/002; G02B 21/0024; G02B 21/0032; G02B 21/0036; G02B 21/0048; G02B 21/0052; G02B 21/0076; G02B 21/006; G02B 21/06; G02B 21/36; G02B 21/361

USPC ....... 359/385, 362, 363, 368, 369, 387, 388, 359/389, 390

See application file for complete search history.

(56) References Cited

U.S. PATENT DOCUMENTS

| 2006/0012866 | A1 | 1/2006 | Wolleschensky |
| 2010/0193673 | A1 | 8/2010 | Dietrich et al. |
| 2016/0048012 | A1 | 2/2016 | Fouquet et al. |

(Continued)

FOREIGN PATENT DOCUMENTS

| DE | 102007047464 A1 | 4/2009 |
| DE | 102013213781 A1 | 9/2014 |
| EP | 1 617 255 A1 | 1/2006 |

(Continued)

*Primary Examiner* — Arnel C Lavarias
(74) *Attorney, Agent, or Firm* — Leydig, Voit & Mayer, Ltd.

(57) ABSTRACT

A light sheet fluorescence microscope includes a light source configured to emit excitation light suitable for inducing fluorescent light emitted from a specimen, a detector configured to detect the fluorescent light from the specimen, and an optical system configured to illuminate the specimen with a light sheet formed from the excitation light, and to guide the fluorescent light from the illuminated specimen to the detector. The optical system includes an objective facing the specimen, the objective being configured to collect the fluorescent light emitted from the specimen. The light source is further configured to emit manipulation light suitable for photomanipulating the specimen. The optical system is further configured to direct the manipulation light through a spatially limited sub-area of an entrance pupil of the objective onto the specimen along a light propagation direction which is different from a light propagation direction of the light sheet.

22 Claims, 7 Drawing Sheets

(56) References Cited

U.S. PATENT DOCUMENTS

2016/0327779 A1 11/2016 Hillman
2019/0265454 A1 8/2019 Kalkbrenner et al.

FOREIGN PATENT DOCUMENTS

| WO | WO 2015/109323 A2 | 7/2015 | |
|----|----|----|----|
| WO | WO 2018/077738 A1 | 5/2018 | |
| WO | WO 2019/038398 A1 | 2/2019 | |
| WO | WO-2021058939 A1 * | 4/2021 | ......... G02B 21/0032 |

\* cited by examiner

LIGHT SHEET FLUORESCENCE MICROSCOPE

CROSS-REFERENCE TO PRIOR APPLICATIONS

Priority is claimed to European Patent Application No. EP 19213913.7, filed on Dec. 5, 2019, the entire disclosure of which is hereby incorporated by reference herein.

FIELD

The present invention relates to a light sheet fluorescence microscope, comprising a light source device configured to emit excitation light suitable for inducing fluorescent light emitted from a specimen, a detector device configured to detect the fluorescent light from the specimen, and an optical system configured to illuminate the specimen with a light sheet formed from the excitation light and to guide the fluorescent light from the illuminated specimen to the detector device, wherein the optical system comprises an objective facing the specimen, the objective being configured to collect the fluorescent light emitted from the specimen. Further, the invention relates to a method for imaging a specimen by means of a light sheet fluorescence microscope.

BACKGROUND

Light sheet fluorescence microscopy is a technique in which a thin slice of a specimen is illuminated with a specific excitation light distribution which is focused only in one direction for example by using a cylindrical lens. Another illumination method uses a collimated light beam which is scanned in one direction to create a light distribution forming a light sheet. Due to the fact that only a portion of the specimen is illuminated which is actually observed, light sheet fluorescence microscopy reduces photo damage and stress induced on a living specimen. Furthermore, in contrast to confocal laser scanning microscopy where the specimen is scanned point by point, light sheet fluorescence microscopy is a wide field technique which allows to generate a three-dimensional stack of images based on optical sections through different planes of the specimen.

In a common approach, a light sheet fluorescence microscope comprises separate objectives for illuminating the specimen with the light sheet and for observing the illuminated object plane. Recently, light sheet methods have been developed which use only one objective both for illumination and detection. For example, by illuminating a small spot of an aperture of a high NA objective, a tilted light sheet may be generated. Thus, an oblique object plane is imaged using a tilted detector configuration. This technique is known as "oblique plane microscopy" (OPM). An extension of OPM called "swept confocally aligned planar excitation microscopy" (SCAPE) has been developed by using a scanning mirror for moving both the light sheet and the object plane to be imaged.

Apart from mere imaging a specimen, photomanipulation, i.e. manipulating the specimen by means of light application, has become more and more important. Thus, a specimen may be photomanipulated during or before actual imaging by e.g. heating, bleaching, photoactivating, photodeactivating etc. For this, a laser beam of suitable intensity and wavelength may be directed to the specimen.

In the field of light sheet fluorescence microscopy, a system capable of photomanipulating a specimen is e.g. disclosed in DE 10 2007 047 464 A1. This system comprises two objectives for illuminating the specimen and for detecting fluorescent light induced in the specimen. In the optical detection path, means for directing manipulation light onto the specimen are provided. However, this known system is not flexible enough in terms of applicability. For example, the system is not applicable to OPM or SCAPE configurations.

SUMMARY

In an embodiment, the present invention provides a light sheet fluorescence microscope which includes a light source configured to emit excitation light suitable for inducing fluorescent light emitted from a specimen, a detector configured to detect the fluorescent light from the specimen, and an optical system configured to illuminate the specimen with a light sheet formed from the excitation light, and to guide the fluorescent light from the illuminated specimen to the detector. The optical system comprises an objective facing the specimen, the objective being configured to collect the fluorescent light emitted from the specimen. The light source is further configured to emit manipulation light suitable for photomanipulating the specimen. The optical system is further configured to direct the manipulation light through a spatially limited sub-area of an entrance pupil of the objective onto the specimen along a light propagation direction which is different from a light propagation direction of the light sheet.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide a light sheet fluorescence microscope and a method for imaging a specimen which allow for a flexible and efficient photomanipulation of the specimen.

A light sheet fluorescence microscope comprises a light source device configured to emit excitation light suitable for inducing fluorescent light emitted from a specimen, a detector device configured to detect the fluorescent light from the specimen, and an optical system configured to illuminate the specimen with a light sheet formed from the excitation light and to guide the fluorescent light from the illuminated specimen to the detector device. The optical system comprises an objective facing the specimen, wherein the objective is configured to collect the fluorescent light emitted from the specimen. The optical system is further configured to direct the manipulation light through a spatially limited sub-area of an entrance pupil of the objective onto the specimen along a light propagation direction which is different from a light propagation direction of the light sheet.

Hereinafter, excitation light or illumination light is to be understood as light which is applied to the specimen in order to induce light emanating therefrom and being suitable to be detected for imaging the specimen. In other words, excitation or illumination light as defined herein directly refers to the imaging process. In particular, the illumination or excitation light may be light which excites the specimen to emit fluorescent light for generating an optical image which represents structural information of the illuminated specimen.

On the other hand, manipulation light is to be understood as light which is applied to the specimen in order to manipulate the same by means of light in a way going beyond pure imaging. For example, manipulation light may comprise light which is used for heating, cutting, photoactivating, photodeactivating, bleaching, triggering chemical reactions e.g. in the field of optogenetics, etc.

The light sheet fluorescence microscope operates to partially illuminate the entrance pupil of the objective with manipulation light in order to photomanipulate the specimen along a direction as desired under the specific experimental circumstances. Thus, applying a partial pupil illumination allows a direction along which the manipulation light propagates into the specimen to be adjusted in a flexible manner by varying the sub-area of the entrance pupil onto which the manipulation light is directed. As the propagation direction of the manipulation light is adjusted to be different from the direction in which the light sheet propagates into the specimen, a region of interest within the object plane illuminated with the light sheet can be freely selected for photomanipulation according to the needs or preferences arising from the specific experimental setup.

The light sheet fluorescence microscope is usable in a wide range of applications. In particular, photomanipulating the specimen through a dedicated sub-area of the entrance pupil allows the microscope to advantageously be used in OPM or SCAPE configurations without being restricted thereto.

Accordingly, the optical system may be configured to illuminate the specimen with the light sheet through the objective. Thus, the objective facing the specimen is commonly used for illuminating the specimen with excitation light and photomanipulating the same with manipulation light as well as for observing the illuminated plane.

The spatially limited sub-area may be located offset from a center of the entrance pupil of the objective. By varying the offset distance from the pupil center, the propagation direction of the manipulation light can be easily adjusted as required in the specific experiment.

The optical system may be preferably configured to direct the excitation light through another spatially limited sub-area of the entrance pupil onto the specimen, wherein this other sub-area is located offset from the sub-area through which the manipulation light is directed onto the specimen. This embodiment may be advantageously applied in OPM and SCAPE configurations.

Preferably, the light propagation direction of the manipulation light emanating from the objective towards the specimen has an angle relative to a direction opposite to a light propagation direction of the fluorescent light emitted by the specimen in an angular range from 0 to ±45°. Specifically, the afore-mentioned angle may be set to zero, i.e. the manipulation light is irradiated onto the specimen in a direction directly opposite to the detection axis. This facilitates to photomanipulate the specimen accurately.

In a preferred embodiment, the optical system comprises a scanning mirror device including at least one tilting mirror which is tiltable for reflecting the excitation light to move the light sheet as a whole through the specimen in a light sheet scanning direction transverse to the light propagation direction of the light sheet.

Preferably, the at least one scanning mirror is tiltable for reflecting both the excitation light and the manipulation light. Thus, the excitation light and the manipulation light can be commonly scanned through the specimen so that imaging and photomanipulating can be easily performed in a coordinated manner.

In a specific embodiment, the scanning mirror device may comprise a scan lens and one single tilting mirror which is located in a rear focal plane of the scanning lens. By arranging the tilting mirror and the scan lens as mentioned above, it is ensured that a tilting movement of the excitation light is converted into a parallel displacement of the excitation lens on the object-side of the scan lens. Thus, the light sheet can be properly scanned through the specimen.

In a preferred embodiment, the scanning mirror device comprises two tilting mirrors located offset to each other along an optical axis of the optical system. This configuration allows that a scan lens can be dispensed with. Thus, using two tilting mirrors rather than one single mirror provides for an additional degree of freedom which can be utilized to freely adjust the (virtual) axis for tilting the exaction light.

Further, in case that the scanning mirror device is provided with two tilting mirrors, these mirrors can be easily controlled to switch between two tilting states, one of which being applied to illuminate the specimen with the excitation light and the other being applied for photomanipulation. Switching between illumination and photomanipulation can be rapidly performed by the scanning mirror device within several milliseconds which is of significant advantageous e.g. in cases in which fast processes shall be observed in a biological specimen.

Preferably, the at least one tilting mirror is tiltable for reflecting the fluorescent light collected by the objective towards the detector device. This allows the microscope to be used a descanned configuration as e.g. provided in OPM or SCAPE.

In a further preferred embodiment, an optical shifting unit is provided which is configured to shift an incident position of the manipulation light on the at least one tiltable mirror for varying the light propagation direction of the manipulation light directed onto the specimen independently of the light propagation direction of the fluorescent light and/or independently of the light propagation direction of the light sheet. This renders the photomanipulation even more flexible in terms its positional relationship relative to the excitation light. For instance, the manipulation light may be directed to a site located outside the object plane which is illuminated with the light sheet The optical shifting unit may comprise at least one element reflecting or emitting the manipulation light, wherein this element is movable to shift the incident position of the manipulation light on the at least one tiltable mirror. For example, the optical shifting unit may be formed by a dichroic mirror which may be used to couple the manipulation into the optical system.

The light source device may be configured to emit the excitation light and the manipulation light along a common optical path into the optical system. This allows to use one single light source emitting both the excitation light and the manipulation light. Alternatively, a plurality of light sources may be integrated in a common casing. All in all, the light source device comprises one or more light sources (for example lasers) and optionally a common casing and/or further optical elements, for example lenses, mirrors, optical filters and/or beam splitters.

For example, the light source device comprises at least one excitation light source (for example a laser) configured to emit the excitation light along at least one first optical path, and at least one manipulation light source (for example a laser) configured to emit the manipulation light along at least one second optical path. The light source device further comprises a light shaping system having an optical input formed by the first and second optical paths and an optical output formed by the common optical path, wherein the light shaping system is configured to selectively shape at least one of the excitation light and the manipulation light.

Preferably, the light source device is switchable between an excitation operating mode for emitting only the excitation light and a manipulation operating mode for emitting only the manipulation light.

The light shaping system may comprise an input merging element configured to merge the first and second optical paths in a third optical path. The input merging element may be formed e.g. by a dichroic mirror.

The light shaping system may further include a beam expander located in the third optical path. The beam expander may be used to shape both the excitation light and the manipulation light in a first step before further light shaping and/or scanning is applied, e.g. for dynamically creating the light sheet, shifting a focus of the manipulation light, displacing the excitation light and/or the manipulation light in directions transverse to the light propagation direction etc.

In an embodiment, the common optical path is formed by the third optical path. Further, the light shaping system may comprise at least one light shaping element and a scanner which are located in the common optical path, wherein, in the excitation operating mode, the light shaping element is configured not to shape the excitation light and the scanner is configured to cause a scanning movement of the excitation light in a predetermined direction transverse to the light propagation direction of the excitation light for generating the light sheet. In the manipulation operating mode, the light shaping element is configured to shape the manipulation light and the scanner is configured to adjust a displacement of the manipulation light in the predetermined direction. According to this embodiment, a single (third) optical path is provided inside the light shaping system for taking effect on both the excitation light and the manipulation. Further, the light shaping system the light sheet is created dynamically, e.g. by rapidly scanning the collimated excitation light through the specimen.

According to a further embodiment, the light shaping system includes a splitting element located in the third optical path and configured to spatially separate the excitation light and the manipulation light from each other, wherein the excitation light propagates in a fourth optical path and the manipulation light propagates in a fifth optical path. The light shaping system further comprises an output merging element configured to merge the fourth and fifth optical paths in the common optical path. Further, the light shaping system comprises an anamorphic optical element located in the fourth optical path, wherein the anamorphic optical element is configured to generate the light sheet from the excitation light. The light shaping system further comprises at least one light shaping element and/or a scanner located in the fifth optical path, wherein the light shaping element is configured to shape the manipulation light and the scanner is configured to adjust a displacement of the manipulation light in a predetermined direction. Here, the light shaping system provides for two separate (fourth and fifth) optical paths in order take effect on the excitation light and the manipulation light, respectively. Further, the light sheet is created by means of optical beam shaping rather than by scanning.

The light shaping element may comprise at least one of an electrically tunable lens, a deformable mirror, a digital mirror device, and a spatial light modulator.

Preferably, the light shaping element is configured to shift a focus of the manipulation light in the light propagation direction thereof. In this case, the light shaping element may be formed by an electrically tunable lens.

According to another aspect, a method is provided for imaging the specimen by means of a light sheet fluorescence microscope, comprising the following steps: emitting excitation light suitable for inducing fluorescent light emitted by the specimen; illuminating the specimen with a light sheet formed from the excitation light; collecting the fluorescent light from the illuminated specimen by means of an objective facing the specimen; and detecting the fluorescent light. The method further comprises the steps of: emitting manipulation light suitable for photomanipulating the specimen; and directing the manipulation light through a spatially limited sub-area of an entrance pupil of the objective onto the specimen along a light propagation direction which is different from a light propagation direction of the light sheet.

Figure 1:
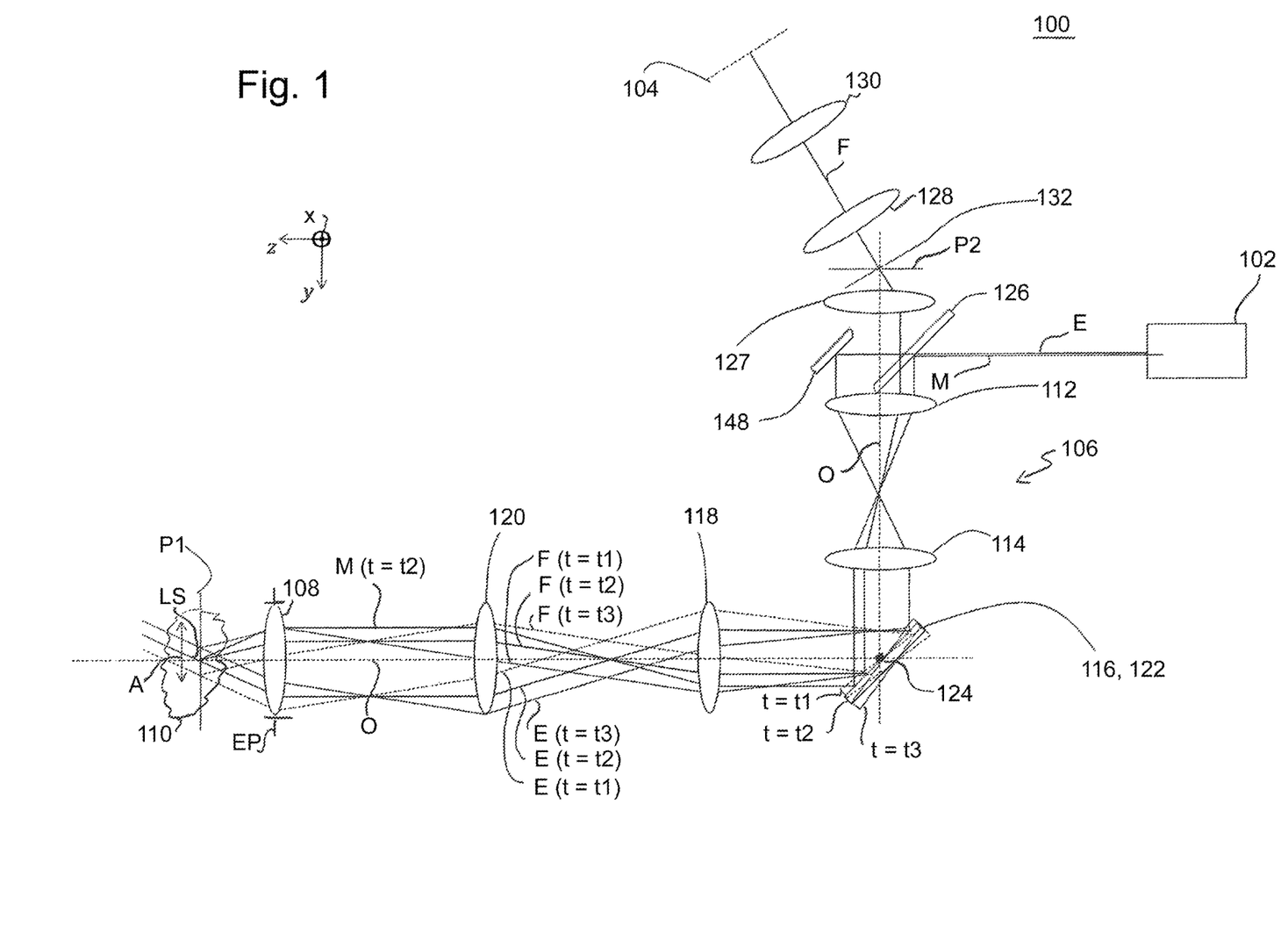
FIG. 1 is a diagram showing a light sheet fluorescence microscope according to an embodiment.

A light sheet fluorescence microscope 100 according to an embodiment is illustrated in the diagram of FIG. 1, wherein only those components of the light sheet fluorescence microscope 100 are shown which are helpful for understanding the embodiment.

According to the specific embodiment shown in FIG. 1, the light sheet fluorescence microscope 100 comprises a light source device 102, a detector device 104 which may be formed by a CCD or CMOS camera suitable for wide field imaging, and an optical system generally designated by reference sign 106. The optical system 106 may comprise a plurality of optical elements, among which an objective 108 faces a specimen 110 which is to be imaged by the light sheet fluorescence microscope 100. As explained in more detail below, the objective 108 may be used for both illumination and detection. Thus, it may be a common objective through which both fluorescence-stimulating illumination light and fluorescence light are guided. Accordingly, the light sheet fluorescence microscope 100 may be operated in SCAPE or OPM configuration. However, the invention shall not be restricted to such a configuration. In particular, the light sheet fluorescence microscope may also comprise two separate objectives for fluorescence-exciting illumination and detection, respectively.

The light source device 102 is configured to emit excitation light E which is suitable to excite the specimen 110 to emit fluorescent light F which is to be detected by the detector device 104. As explained below in more detail with reference to FIGS. 6 and 7, the light source device 102 may be configured to shape a light sheet LS from the excitation light E for illuminating only a thin slice of the specimen 110 at a given point in time. In the specific embodiment shown in FIG. 1, the light sheet LS illuminating the specimen 110 propagates in a direction which is oblique to the optical axis O of the optical system 106. Referring to an orthogonal xyz coordinate system indicated in FIG. 1, the light sheet LS illuminating the specimen 110 is expanded in a direction parallel to the x-axis which is orthogonal to the propagation direction of the light sheet LS. Accordingly, the illumination plane formed by the light sheet LS is defined by two axes, one of which given by the light sheet propagation direction lying in the xz-plane and the other being the x-axis.

The optical system 106 is configured to illuminate the specimen 110 with the light sheet LS formed from the excitation light E as well as to guide the fluorescent light F from the illuminated specimen 110 to the detector device 104. In the embodiment of FIG. 1, the optical system 106 comprises a first lens 112, a second lens 114, a scanning mirror device 116, a third lens 118, a fourth lens 120 and the objective 108 facing the specimen 110. Each of the lenses 112 and 120 serves as a tube lens, wherein the lens 118 is configured as a scan lens. According to the embodiment shown in FIG. 1, the scanning mirror device 116 is formed by a single tilting mirror 122 which reflects the excitation light E passing the lenses 112, 114 through the lenses 118, 120 into the objective 108 for illuminating the specimen 110 with the light sheet LS. The tilting mirror 122 is movable around a tilt axis 124 which is oriented parallel to the x-axis.

In order to illustrate the tilting movement performed by the scanning mirror device 116, FIG. 1 shows the tilting mirror 122 in three different tilting positions at consecutive times t=t1, t=t2, and t=t3. Depending on the respective tilting position, the tilting mirror 122 reflects the excitation light E in different directions resulting in a scanning movement of the light sheet LS within the specimen 110 in a direction parallel to the y-axis. In other words, the scanning mirror device 116 serves to move the light sheet LS as a whole through the specimen 110 in a light sheet scanning direction which is illustrated in FIG. 1 by a double arrow A. For simplicity, the excitation light E performing the afore-mentioned scanning movement is illustrated by its principle ray, wherein E(t=t1) represents the excitation light E which is reflected by the tilting mirror 122 at the time t=t1. Likewise, the principle ray E(t=t2) illustrates the excitation light E reflected by the tilting mirror 122 at the time t=t2, and the principle ray E(t=t3) represents the excitation light E reflected by the tilting mirror 122 at the time t=t3.

In the configuration shown in FIG. 1, the tilting mirror 122 is located in a rear, i.e. image-side focal plane of the scan lens 118. By locating the tilting mirror 122 in the focal plane of the scan lens 118, it is ensured that a tilting movement of the excitation light E on the tilting mirror 122 is converted into a parallel displacement of the excitation light E on an object side of the scan lens 118. This parallel displacement of the excitation light E is illustrated by the principle rays E(t=t1), E(t=t2), and E(t=t3) propagating parallel to each other between the scan lens 118 and the tube lens 120 as well as when emanating from the objective 108 into the specimen 110. Accordingly, the tilting movement performed by the scanning mirror device 116 results in a parallel displacement of the light sheet LS within the specimen 110 in y-direction.

The fluorescent light F induced by the excitation light E is collected by the objective 108 and propagates in a direction opposite to the propagation direction of the excitation light E through the optical system 106 up to the tube lens 112. Subsequently, the fluorescent light F passes a dichroic mirror 126 which is configured to selectively transmit both the fluorescent light F and the excitation light E. Accordingly, in the specific embodiment shown in FIG. 1, the dichroic mirror 126 is used as a beam splitter for separating the excitation light E and the fluorescent light F. Further, a mirror 148 is provided serving as an element for coupling the excitation light E into the optical system 106. Needless to say that the configuration formed by the mirrors 126, 148 for implementing the afore-mentioned light separation and coupling functions is to be understood merely as an example. Other configurations may be used as will become evident from further embodiments described later.

After passing the dichroic mirror 126, the fluorescent light F propagates through an optical detection system formed by two objectives 127, 128 and a tube lens 130 towards the detector device 104. Between the objectives 127, 128, an intermediate image plane 132 is located in which an intermediate image of the plane illuminated with the light sheet LS is formed. This intermediate image is imaged onto the detector device 104.

As can be seen from FIG. 1, the optical path leading to the detector device 104 is oblique relative to the optical path between the objective 108 and the tube lens 112. This reflects the fact that in SCAPE or OPM configuration the light sheet LS is oblique relative to an object-side focal plane P1 of the objective 108. Correspondingly, a plane P2 conjugate to the focal plane P1 is oblique relative to the intermediate image plane 132.

As the fluorescence light F emanating from the specimen 110 is guided to the tilting mirror 122, the optical system 106 of the light sheet fluorescence microscope 100 forms a so-called descanned configuration. Such a descanned configuration ensures that the illuminated plane within the specimen 110 is continuously detected by the stationary detector device 104 while the illuminated plane is scanned in y-direction through the specimen 110. As in the case of the excitation light E, this fact is illustrated in FIG. 1 by indicating the principle rays F(t=t1), F(t=t2), and F(t=t3) of the fluorescent light F for the different tilting positions in which the tilting mirror 122 is located at times t1, t2, and t3.

As already mentioned above, the embodiment shown in FIG. 1 corresponds to a SCAPE or OPM configuration. Therefore, both the excitation light E and the fluorescent light F pass through the objective 108. Specifically, neither the excitation light E nor the fluorescent light F fully utilize the aperture of the objective 108. In fact, the excitation light E and the fluorescent light F pass the objective 108 through different portions thereof, these portions being eccentrically located on opposite sides of the optical axis O.

The light source device 102 is further configured to emit manipulation light M which is suitable to photomanipulate the specimen 110. As already explained above, photomanipulating the specimen 110 is to be understood broadly as light application which is not exclusively related to imaging as for example heating, bleaching etc.

In the specific configuration shown in FIG. 1, the dichroic mirror 126 is used to introduce the manipulation light M into the optical system 106. Accordingly, the characteristic of the dichroic mirror 126 is selected such that the dichroic mirror 126 reflects both the manipulation light M and the excitation light E and transmits the fluorescent light F. Thus, in the present embodiment it is assumed that the manipulation light M has essentially the same wavelength as the excitation light E. In such a case, a single laser source may be used to generate both the excitation light E and the manipulation light M.

As shown in FIG. 1, the manipulation light M passes the tube lens 112 through a portion which is different from a portion through which the excitation light E propagates through the tube lens 112. As a result, after passing the lenses 112, 114, the manipulation light M falls onto the tilting mirror 112 at an incident position which is different from the incident position of the excitation light E. Accordingly, after being reflected by the titling mirror 122, the manipulation light M propagates towards the objective 108 in a direction which is different from the propagation direction of the excitation light E. Thus, the optical system 106 is configured to direct the manipulation light M into the specimen 110 along a light propagation direction which is different from the propagation direction of the light sheet LS formed from the excitation light E. The manipulation light M passes the objective 108 through a spatially limited sub-area of an entrance pupil EP of the objective 108.

As the manipulation light M is reflected by the tilting mirror 122, the manipulation light M performs a scanning movement in y-direction as the excitation light E does. However, for simplifying the illustration, FIG. 1 indicates the manipulation light M only by means of a single principle ray M(t=t2) which belongs to the manipulation light M referring to the tilting position of the tilting mirror 122 at the time t=t2.

The light sheet fluorescence microscope 100 may comprise an optical shifting unit which is configured to shift the incident position of the manipulation light M on the tilting mirror 122. For example, such an optical shifting unit may be formed by the dichroic mirror 126. Thus, the dichroic mirror 126 may be configured to be movable along the propagation direction of the manipulating light M falling onto the dichroic mirror 126, i.e. according to the configuration of FIG. 1 in a direction parallel to the z-axis. By moving the dichroic mirror 126 in such a way, the portion of the tube lens 122, through which the manipulation light M passes, is shifted perpendicular to the optical axis O. Thus, the incident position of the manipulation light M on the tilting mirror 122 changes by moving the dichroic mirror 126 resulting in a corresponding variation of the direction in which the manipulation light M propagates into the specimen 110.

By moving the dichroic mirror 126, the propagation direction of the manipulation light M can be varied independently of the propagation directions of the excitation light E and the fluorescent light F.

By shifting the dichroic mirror 126 in a direction perpendicular to the optical axis O of the optical system 106 the propagation direction of the manipulation light M emanating from the objective 108 towards the specimen 110 can be varied in a wide range. For example, the angle of the propagation direction of the manipulation light M relative to a direction opposite to the propagation direction of the fluorescent light F emitted by the specimen 110 may be varied in an angular range from 0 to ±45°. In particular, it may be advantageous to set the afore-mentioned angle to 0, i.e. to irradiate the manipulation light onto the specimen along a direction which is directly opposite to the direction along which the florescent light F is collected by the objective 108. In this respect, it is to be noted that the light propagation directions explained herein refer to the principal rays of the corresponding light beams.

Figure 2:
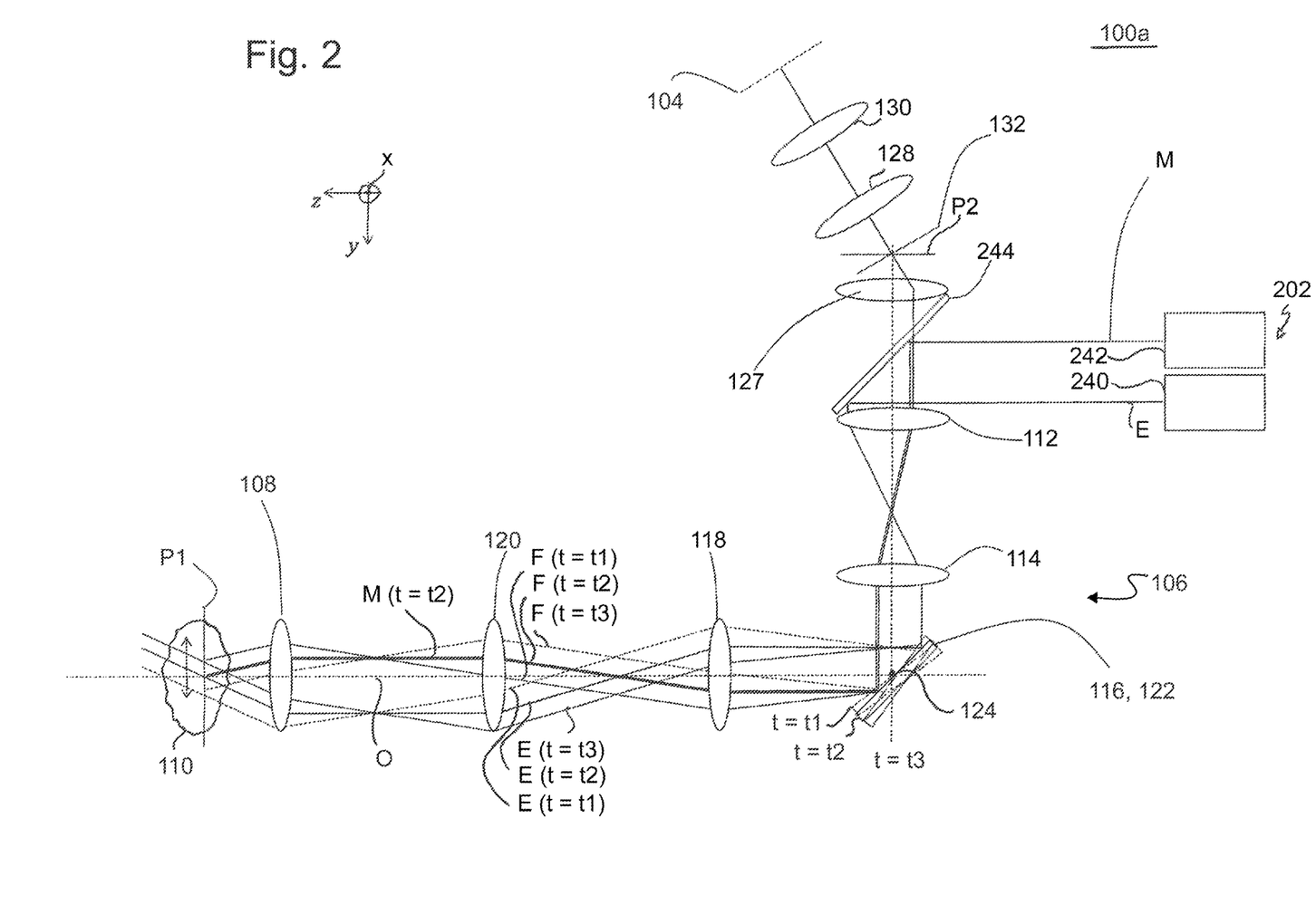
FIG. 2 is a diagram showing a light sheet fluorescence microscope according to another embodiment.

FIG. 2 shows a light sheet fluorescence microscope 100a which represents a modified embodiment of the configuration of FIG. 1. The modification compared to the light sheet fluorescence microscope 100 shown in FIG. 1 relates to a light source device 202 replacing the light source device 102 shown in FIG. 1.

Whereas the light source device 102 of FIG. 1 emits the excitation light E and the manipulation light M along a common optical path, i.e. in a collinear manner, into the optical system 106, the light source device 202 of the light sheet fluorescence microscope 100a shown in FIG. 2 outputs the excitation light E and the manipulation light M along two separate optical paths which may lie parallel to each other. Accordingly, the light source device 202 is comprised of two separate light sources 240 and 242 which output the excitation light E and the manipulation light M, respectively.

In contrast to the configuration of FIG. 1, the light sheet fluorescence microscope 100a shown in FIG. 2 comprises a single component e.g. in form of a dichroic mirror 244 for commonly introducing the excitation light E and the manipulation light M into the optical system 106. As can be seen in FIG. 2, the dichroic mirror 244 is adapted to the light source device 202 such that both the excitation light E and the manipulation light M are reflected into the optical system 106. Further, insofar corresponding to the dichroic mirror 126 shown in FIG. 1, the characteristic of the dichroic mirror 244 of the light sheet fluorescence microscope 100a is adapted to transmit the fluorescent light F towards the detector device 104.

As the excitation light E and the manipulation light M are commonly reflected by the dichroic mirror 244, in contrast to the embodiment shown in FIG. 1, the light sheet fluorescence microscope 100a of FIG. 2 does not provide for a variation of the propagation direction of the manipulation light M independently of the propagation direction of the excitation light E. Thus, whereas the dichroic mirror 126 of FIG. 1 only acts on the manipulation light M, the dichroic mirror 244 shown in FIG. 2 reflects both the excitation light E and the manipulation light M. Thus, the positional relationship between the excitation light E and the manipulation light M is not changed by the dichroic mirror 244 even if the dichroic mirror 244 was moved in a direction perpendicular to the optical axis O of the optical system 106. In other words, according to the embodiment shown in FIG. 2, the direction along which the specimen 110 is photomanipulated by the manipulation light M does not change in relation to the direction along which the excitation light E illuminates the specimen 110. Accordingly, at any given time t1, t2, t3, the corresponding principle ray of the manipulation light M intersects the corresponding principle ray of the excitation light E in the focal plane P1 of the objective 108. As in FIG. 1, it is to be noted that FIG. 2 shows only one principle ray M (t=t2) which intersects the principle ray E(t=t2) of the excitation light in the focal plane P1. In contrast, according to the configuration shown in FIG. 1, it is possible to vary the position in which the principle ray M(t=t2) intersects the focal plane P1 enabling the positional relationship between the manipulation light M and the excitation light E to be varied within the specimen 110.

It is to be noted that even in the embodiment shown in FIG. 2, it may be possible to vary the propagation direction of the manipulation light M independently of the propagation direction of the excitation light E, namely e.g. in case the manipulation light source 242 includes means for shifting the manipulation light M correspondingly.

Figure 3:
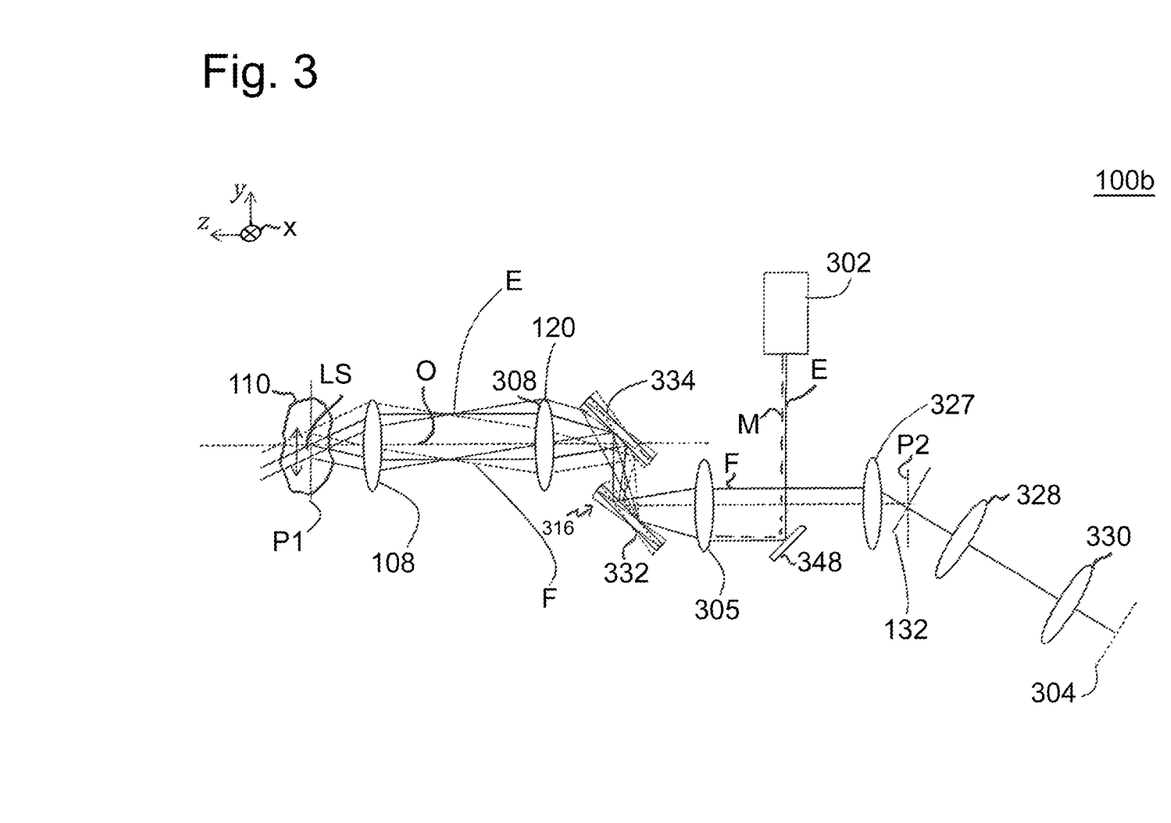
FIG. 3 is a diagram showing a light sheet fluorescence microscope according to another embodiment.

FIG. 3 is a diagram showing a light sheet fluorescence microscope 100b representing a further embodiment. The light sheet fluorescence microscope 100b differs from the embodiments shown in FIGS. 1 and 2 mainly by a modified scanning mirror device 318.

As the microscopes shown in FIGS. 1 and 2, the light sheet fluorescence microscope 100b of FIG. 3 comprises a light source device 302 emitting the excitation light E and the manipulation light M. The light sheet fluorescence microscope 100b further comprises an optical system 306 which includes a tube lens 305, the scanning mirror device 316, a further tube lens 308 and the objective 108. The excitation light E and the manipulation light M are coupled into the optical system 306 by means of a mirror 348.

The fluorescent light F emitted from the specimen 110 propagates through the optical system 306 in a direction essentially opposite to the propagation direction of the excitation light E and the manipulation light M. After passing the tube lens 305, the fluorescent light F propagates through two objectives 327, 328 and a tube lens 330 to a detector device 304.

Whereas the light sheet fluorescence microscope 100b is fundamentally operated in the same manner as the microscopes shown in FIGS. 1 and 2, the configuration of FIG. 3 is advantageously modified in terms of the tilting operation of the scanning mirror device 316 which is applied to scan the light sheet LS as a whole in y-direction through the specimen 110. Thus, according to the configurations shown in FIGS. 1 and 2, the single tilting mirror 122 is located in the rear focal plane of the scan lens 118 to ensure that the tilting movement of the excitation light E on the tilting mirror 122 is converted into a parallel displacement of the excitation light E on the object side of the scan lens 118. However, using a scan lens for the afore-mentioned purpose may have some drawbacks, in particular in terms of costs as a tube lens is rather expensive. Therefore, the light sheet fluorescence microscope 100b shown in FIG. 3 is modified in such a way that a scan lens can be dispensed with.

Figure 4:
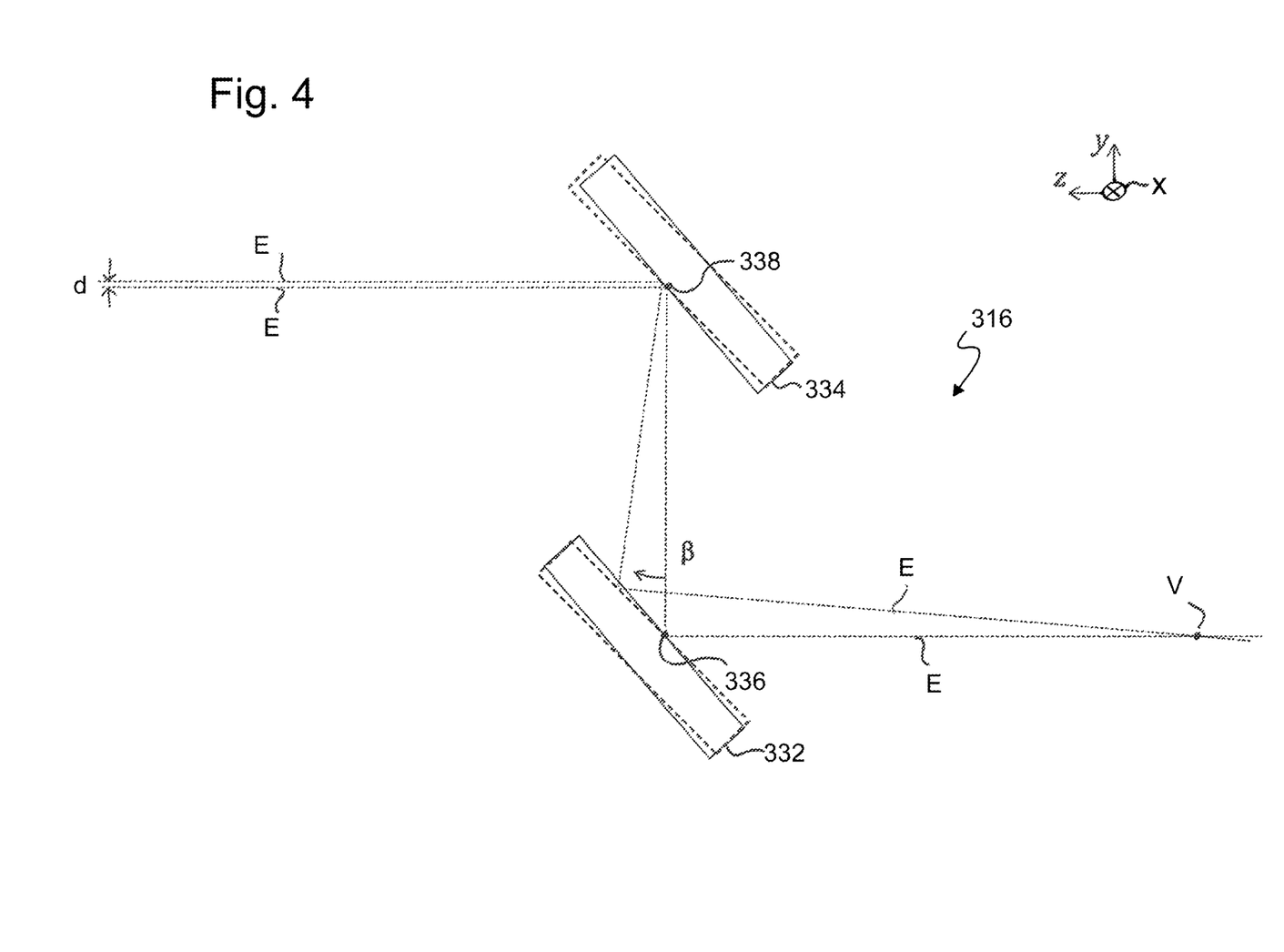
FIG. 4 is a diagram showing a scanning mirror device included in the light sheet fluorescence microscope of FIG. 3.

Specifically, the scanning mirror device 316 comprises two tilting mirrors 332, 334 which are located offset to each other along the optical axis O of the optical system 306. Each of the tilting mirrors 332, 334 is movable around a tilt axis 336, 338 as shown in FIG. 4. The respective tilt axis 336, 338 is oriented parallel to the x-axis.

By using the two tilting mirrors 332, 334 instead of one single tilting mirror as provided in the configurations of FIGS. 1 and 2, the intended parallel displacement of the excitation light E emanating from the scanning mirror device 316 can be achieved without providing a dedicated scan lens. Thus, the two tilting mirrors 332, 334 provide for an additional degree of freedom in terms of adjusting the tilting operation which results in a virtual tilt axis about which the excitation light E is tilted when operating the scanning mirror device 316. In other words, in case of using one single tilting mirror, the axis for tilting the excitation light E is fixed (see tilt axis 124 in FIGS. 1 and 2). In contrast, when using the two tilting mirrors 332, 334 having two physical tilt axes 336, 338, a virtual, i.e. non-physical tilt axis can be freely created as needed.

In the present configuration, this virtual tilt axis is located such that the intended parallel displacement of the excitation light E propagating towards the specimen 110 is achieved. In the example shown in FIG. 4, two tilting states of the scanning mirror device 316 are illustrated, a difference between these two tilting states corresponding to a tilting angle β. The tilting angle R defines the amount of tilting about a virtual tilt axis V which is located on the image side of the first tilting mirror 332. Tilting the excitation light E in the amount of angle β about the virtual tilt axis V is converted into a parallel displacement d of the excitation light E on the object side of the second tilting mirror 334. According to the configuration shown in FIGS. 3 and 4, the virtual tilt axis V is located in the rear, i.e. image-side focal plane of the objective 108 (or a plane conjugate thereto).

It is to be noted that FIG. 3 does not illustrate the scanning movement of the manipulation light M achieved by operating the scanning mirror device 316 as explained above. However, in terms of the fundamental operation for scanning the excitation light E and the manipulation light M in y-direction through the specimen 110, the embodiment shown in FIG. 3 does not differ from the configurations of FIGS. 1 and 2.

The light source device 102, 302 may be switchable between an excitation operating mode and a manipulation operating mode. In the excitation operating mode, the light source device 102, 302 emits only the excitation light E, and the manipulation light M is shut off. Likewise, in the manipulating operating mode, the light source device 102, 302 emits only the manipulation light M, and the excitation light E is shut off.

Figure 5:
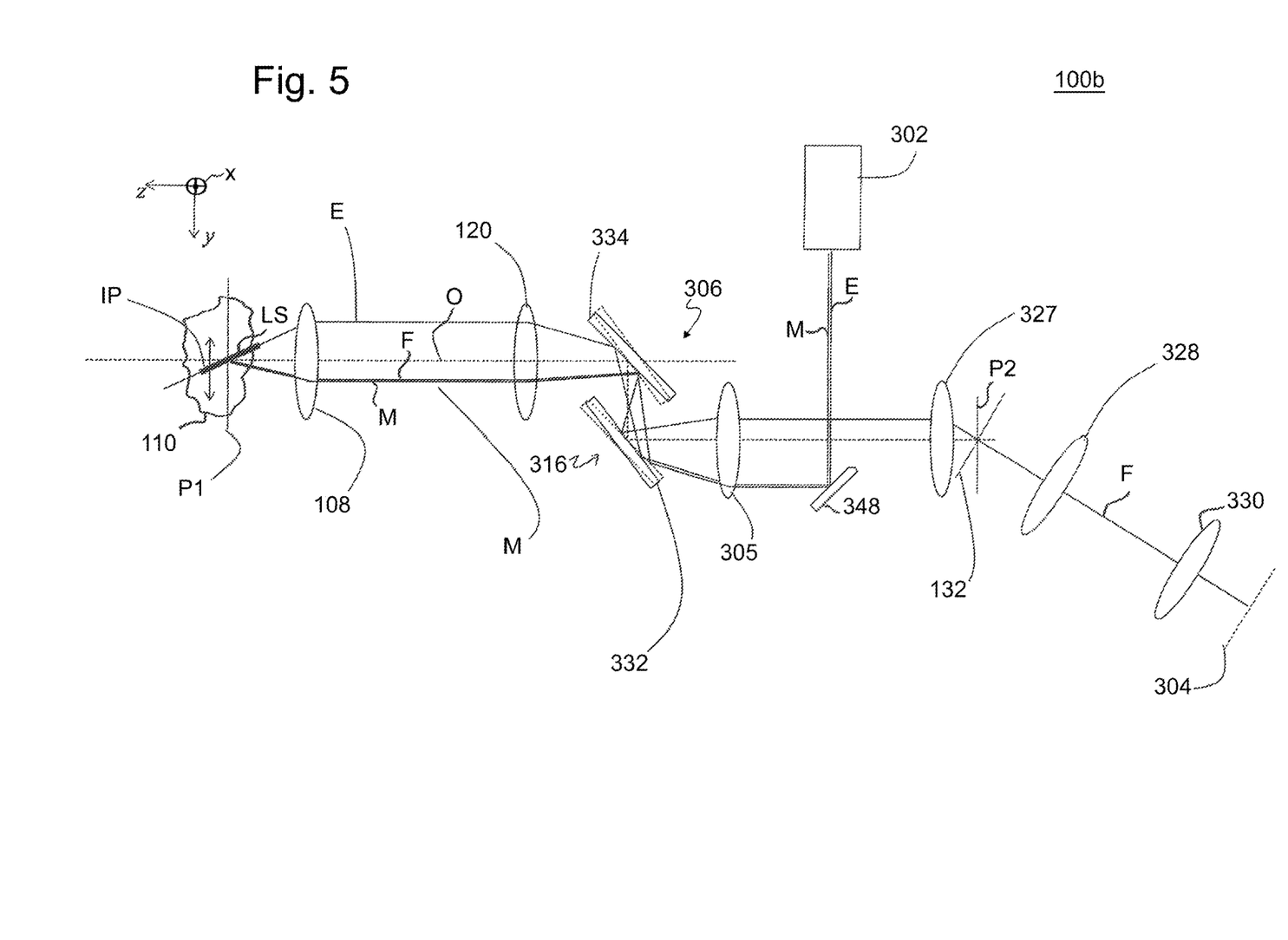
FIG. 5 is a diagram which illustrates rapid switching between illumination and photomanipulation in the fluorescence microscope of FIG. 3.

The diagram shown in FIG. 5 illustrates how the scanning mirror device 316 of the light sheet fluorescence microscope 100b can be used to rapidly switch between illumination of the specimen 110 by means of the excitation light E and photomanipulation by directing the manipulation light M into the specimen 110.

FIG. 5 shows two tilting states of the scanning mirror device 316 indicated by solid and dashed lines, respectively. The tilting state illustrated by solid lines refers to the excitation operating mode in which only the excitation light E is emitted into the specimen. Likewise, the tilting state illustrated by dashed lines refers to the manipulation operating mode in which only the manipulation light M is emitted into the specimen 110. Accordingly, the light source device 302 may be controlled in such a manner that in the excitation operating mode only the excitation light E is generated, and in the manipulation operating mode only the manipulation light M is generated.

Thus, in the excitation operating mode, a plane IP of the specimen 110, which is illuminated by the light sheet LS, is imaged onto the detector device 104. By switching to the excitation mode, a certain area of the object plane IP may be photomanipulated along a direction which is different from the propagation direction of the light sheet LS.

It is to be noted that it is possible to switch the scanning mirror device 316 very fast between the afore-mentioned tilting states. Indeed, the scanning mirror device 316 can be switched within a few milliseconds. Accordingly, it is possible to rapidly change between illumination and photomanipulation of the specimen 110. Further, by appropriately controlling the tilting movement of the two tilting mirrors 332, 334, the propagation direction of the manipulation light M can be varied in a wide range.

The embodiments shown in FIGS. 1, 3 and 5 are configured to couple the excitation light E and the manipulation light M in a collinear manner, i.e. along a common optical path into the optical system 106, 306. Accordingly, the light source device 102, 302 may be formed by a combined source for emitting both the excitation light E and the manipulation light M. Such a combined source is advantageous e.g. in terms of a compact design. Thus, different laser sources generating the excitation light E and the manipulation light M, respectively, may be integrated in a common casing.

However, it is a challenge to provide such a combined source meeting specific requirements arising in light sheet microscopy. Thus, the source should be capable of generating the light sheet LS in a desired orientation as well as of shaping the manipulation light M as needed. For example, a focus of the manipulation light M may be shifted in z-direction. Further, the manipulation light M may be deflected in x- and y-direction.

Figure 6:
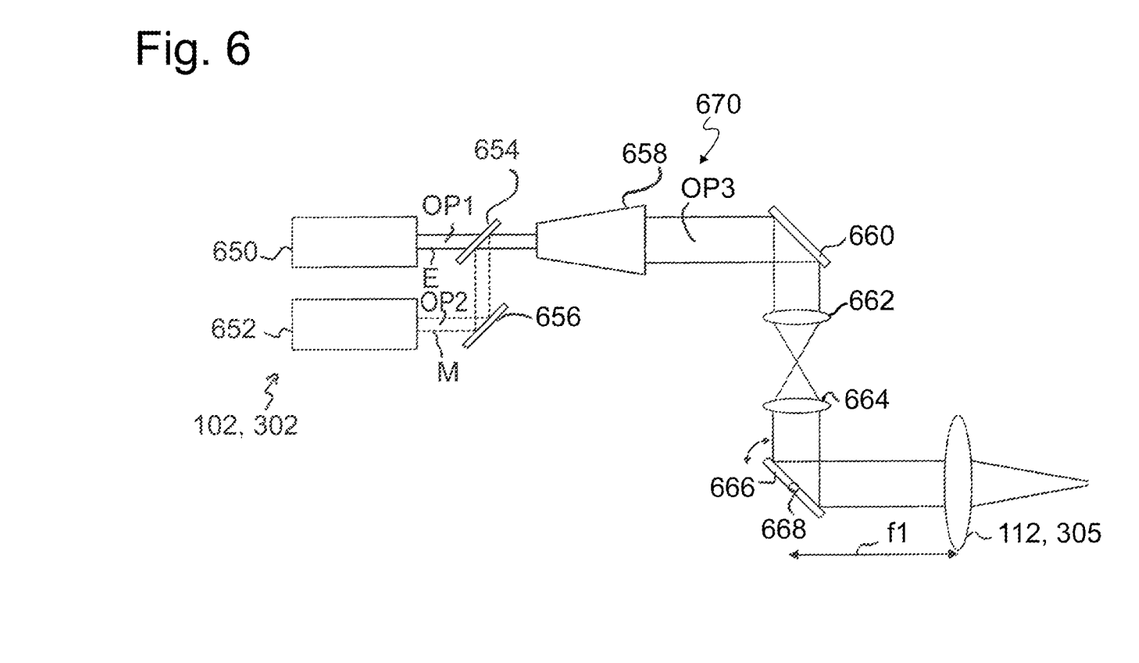
FIG. 6 is a diagram showing a light source device according to an embodiment usable in the light sheet fluorescence microscope as shown in FIGS. 1 and 3.
Figure 7:
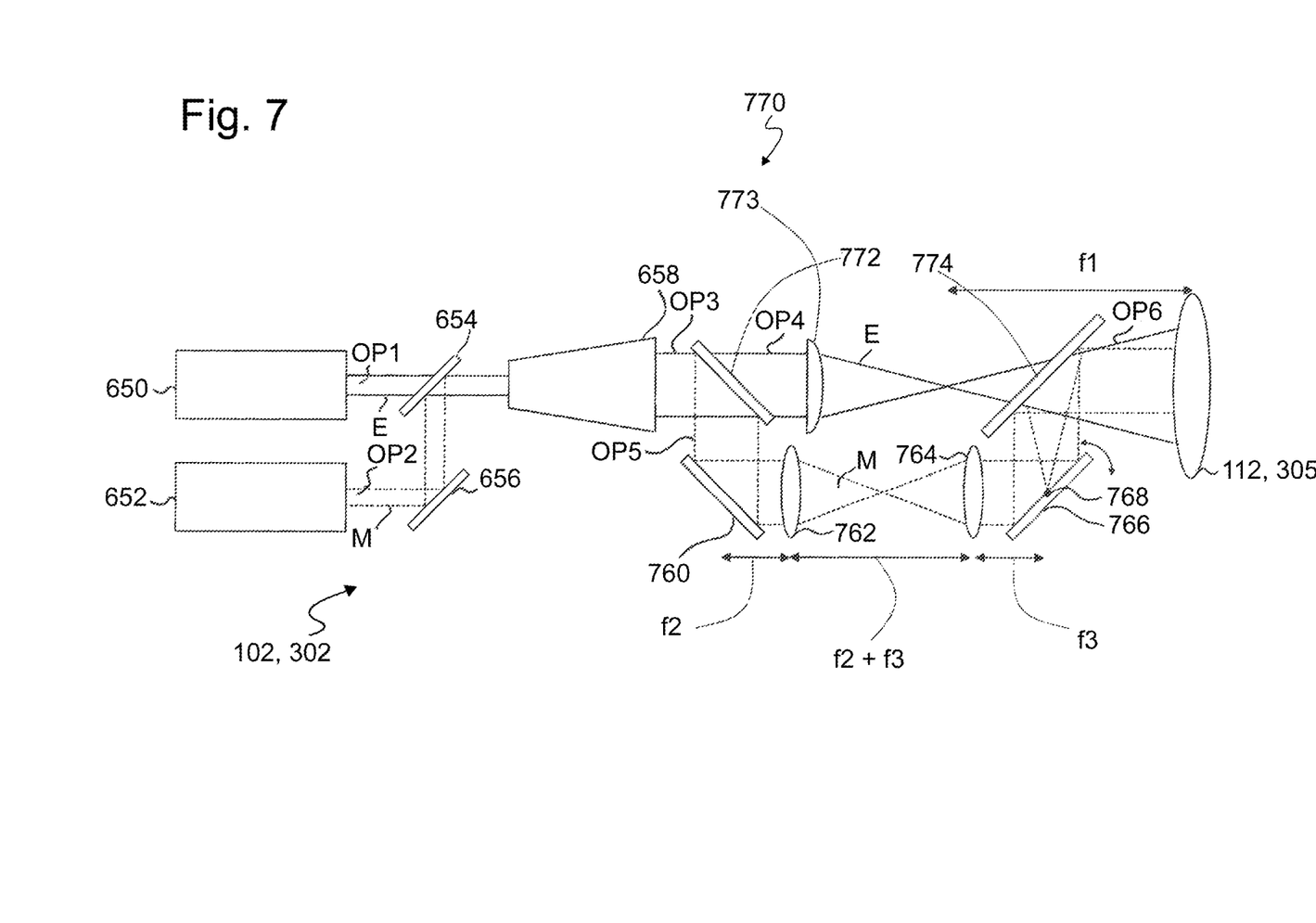
FIG. 7 is a diagram showing a light source device according to another embodiment.

FIGS. 6 and 7 show different embodiments of the light source device 102, 302 which may be used to satisfy the afore-mentioned requirements.

The light source device 102, 302 according to FIG. 6 comprises an excitation light source 650 emitting the excitation light E along a first optical path OP1 and a manipulation light source 652 emitting the manipulation light M along a second optical path OP2. The first and second optical paths OP1, OP2 may be located offset from each other in parallel. The light source device 102, 302 further comprises a dichroic mirror 654, the characteristic thereof being adapted to transmit the excitation light E and to reflect the manipulation light M which is deflected by a mirror 656 onto the dichroic mirror 654. Thus, the dichroic mirror 654 may serve as an input merging element which is configured to merge the first and second optical paths OP1, OP2 in a common third optical path in which the excitation light E and the manipulation light M propagate.

The light source device 102, 302 further comprises a beam expander 658 by which the cross-sections of the excitation light E and the manipulation light M are expanded in a direction perpendicular to the light propagation direction. Subsequent to the beam expander 658, an optical light shaping element 660 is located in the third optical path OP3. The light shaping element 660 may be formed by an electrically tunable lens (ETF), a deformable mirror (DM), a digital mirror device (DMD) or a spatial light modulator (SLM). Further, two lenses 662, 664 and a scanner 666 are included in the third optical path OP3. The scanner 666 may be formed by a mirror which is tiltable around a tilt axis 668 which is oriented parallel to the z-axis. In this respect, it is to be noted that the plane of drawing in FIG. 6 is perpendicular to the plane of drawing in FIGS. 1 to 5.

The afore-mentioned elements 654 to 666 form a light shaping system 670, an optical input thereof being defined by the first and second optical paths OP1, OP2 and an optical output thereof being defined by the third optical path OP3. According to the configuration shown in FIG. 6, the third optical path OP3 is used as the common optical path along which the light source device 102, 302 emits the excitation light E and the manipulation light M into the optical system 106, 306. In FIG. 6, only the tube lens 112, 305 of the optical system 106, 306 is shown.

The light source device 102, 302 can be operated in the excitation operating mode for generating only excitation light E and in the manipulation operating mode for generating only the manipulation light M. The light shaping system 670 is operated in different ways, depending on whether the excitation operating mode or the manipulation operating mode is selected. For example, the light shaping system 670 may be controlled in the excitation operating mode such that the light shaping member 660 is neutral with respect to the excitation light E, i.e. does not have any effect on the excitation light E in terms of light shaping. Further, in the excitation operating mode, the scanner 666 may be operated to perform a very fast tilting movement around the tilt axis 668 in order to scan the excitation light E in x-direction through the specimen 110 for generating the light sheet LS. Accordingly, the light sheet LS is dynamically generated in this embodiment.

In contrast, in the manipulating operating mode, the light shaping system 670 is controlled such that the light shaping element 660 acts on the manipulation light M in order to shape the same in a desired manner. For example, the light shaping element 660 may shift the focus of the manipulation light M in z-direction. On the other hand, the scanner 666 is operated in the manipulation operating mode such that it serves as a detector element. Thus, the scanner 666 may provide for a displacement of the manipulation light M in x-direction.

The light shaping element 670 may be located in a plane which is conjugate to an object-side focal plane of the objective 108. Alternatively, the light shaping element 607 may be positioned in an image-side focal plane of the objective 108. In this case, the lenses 662, 664 may form a telecentric optical system in which the lenses 662, 664 are located at a distance from each other being equal to the sum of their focal lengths. Thus, the lenses 662, 664 may form a so-called 4f system.

The scanner 668 is preferably located in a rear focal plane of the tube lens 112, 305, i.e. at a distance from the tube lens 112, 305 which equals the rear focal length f1 thereof. Alternatively, the scanner 666 may be located in a plane conjugate to the rear focal plane of the tube lens 112, 305. In any case, the afore-mentioned plane, in which the scanner 666 is located, in conjugate to the rear focal plane of the objective 108.

In the configuration shown in FIG. 6, the scanner 666 is tiltable about the tilt axis 668 such that a light beam displacement in x-direction is caused inside the specimen 110. In addition, the scanner 666 may be tiltable about a second tilt axis perpendicular to the tilt axis 668 in order to create a beam displacement in y-direction within the specimen 110. As a result of such a displacement in y-direction, the focus of the excitation light E or the manipulation light M is not located anymore in the object plane IP imaged onto the detector device 104 (see FIG. 5). Rather, the light focus is offset from the plane IP in y-direction.

The configuration shown in FIG. 6 is to be understood merely as an example. For instance, it is possible to combine the elements causing the two optical imaging processes related to the excitation light E and the manipulation light M, respectively. Furthermore, the sequence in which the lighting shaping element 660 and the scanner 666 are provided may be reversed, and multiple of light shaping elements and scanners by be provided. Likewise, more than two laser sources may be provided, e.g. for implementing a cascade of light sources.

FIG. 7 shows another embodiment of the light source device 102, 302 comprising a modified light shaping system 770. Whereas according to the configuration shown in FIG. 6, the third optical path OP3 extending from the beam expander 658 directly forms the optical output for supplying the excitation light E and the manipulation light M to the optical system 106, 306, the embodiment shown in FIG. 7 provides for a separation of the excitation light E and the manipulation light M subsequent to the beam expander 658 as explained hereinafter.

The beam shaping system 770 of FIG. 7 comprises a splitting element 772, e.g. a switchable mirror or a dichroic element which is configured to spatially separate the excitation light E and the manipulation light M. Needless to say that a dichroic element may only be used as splitting element in case that the excitation light E and the manipulation light M output from the light sources 650, 652 have different wavelengths. In contrast, a switchable mirror may be used irrespectively of the wavelengths of the excitation light E and the manipulation light M.

In the example of FIG. 7, it is assumed that the excitation light E propagates in a fourth optical path OP4 extending from the splitting element 772. In the fourth optical path OP4, an anamorphic optical element 773, e.g. a cylinder lens, is provided which is configured to optically shape the excitation light E such that a focus with elliptical cross-section is created in the image-side focal plane of the objective 108. In the example shown in FIG. 7, a long axis of the elliptical cross-section in the image-side focal plane of the objective 108 extends in y-direction, whereas a short axis extends in x-direction. Accordingly, the plane illuminated with the light sheet LS within the specimen 110 extends in x-direction. In this respect, it is to be noted that the plane of drawing in FIG. 7 is perpendicular to the plane of drawing in FIGS. 1 to 5.

The manipulation light M propagates in a fifth optical path OP5 extending from the splitting element 772 to the light shaping element 760 which may comprise a DM, DMD, SLM and/or an ETL. For example, the light shaping elements 760 may be used to shift the focus of the manipulation light M in z-direction. In such an application, an ETL may preferably be used.

The light shaping system 770 further comprises two lenses 762, 764 and a scanner 766 having a tilt axis 768 which is oriented in z-direction. By tilting the scanner 766 about the tilt axis 768, the manipulation light M can be displaced in x-direction.

The light shaping system 770 further comprises an output merging element 774 which is configured to merge the fourth optical path OP4 and the fifth optical path OP5 in a sixth optical path OP6 which extends to the tube lens 112, 305 of the optical system 106, 306. Accordingly, the sixth optical path OP6 represents the common optical path which is used to output the excitation light E and the manipulation light M in a collinear, i.e. spatially coinciding manner to the optical system 106, 306. As the splitting element 772, the output merging element 774 may be formed by a switchable mirror or a dichroic element.

In the configuration shown in FIG. 7, the scanner 766 is preferably located in the rear focal plane of the tube lens 112, 305 having the rear focal length f1. Further, the light shaping element 760 may be located in a plane which is conjugate to the object-side focal plane of the objective 108. For this, the lenses 762, 764 having focal lengths f2, f3, respectively, form a 4f-system. Further, according to an advantageous embodiment, each of the light shaping element 760 and the scanner 766 may be located in a plane which is conjugated to the image-side focal plane of the objective 108.

Needless to say that the afore-mentioned embodiments of the light source device 102, 302 are to be understood merely as examples. In particular, the light source device is not limited to a configuration in which the excitation light E and the manipulation light M are output in a collinear manner, i.e. along a common optical path. Rather, as shown in the embodiment of FIG. 2, two separate optical paths for coupling the excitation light E and the manipulation light M into the optical system 106 may be provided. In particular, the embodiments shown in FIGS. 6 and 7 may be modified to adapt the configurations shown therein to a light source device having two separate optical outputs. For example, referring to FIG. 7, such a modification may be achieved by omitting the output merging element 774. In this case, the excitation light E and the manipulation light M is coupled into the optical system 106, 306 along the two separate optical paths OP4, OP5, respectively.

Further, the explanations regarding the examples shown in FIGS. 6 and 7 refer to the coordinate systems shown in FIGS. 1 to 5. However, it is to be noted that the specific directions in particular in terms of scanning or shifting the different types of light within the system are to be understood throughout this specification merely as examples, and may be modified as needed. Likewise, the light source devices shown in FIGS. 6 and 7 should only be understood as exemplary configurations which may be used in abstracted form for implementing the light source devices 102, 302 in the embodiments shown in FIGS. 1 to 5. In other words, the configurations shown in FIGS. 6 and 7 may be suitably adapted when being implemented in the embodiments of FIGS. 1 to 5. For example, optical elements (as e.g. a dichroic mirror) may be added or removed as needed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 100a, 100b light sheet fluorescence microscope
102 light source device
104 detector device
106 optical system
108 objective
110 specimen
112 tube lens
114 lens
116 scanning mirror device
118 scan lens
120 tube lens
122 tilting mirror
124 tilt axis
126 dichroic mirror
127 objective
128 objective
130 tube lens
132 intermediate image plane
202 light source device
244 dichroic mirror
302 light source device
304 detector device
305 tube lens
306 optical system
316 scanning mirror device
327 objective
328 objective
330 tube lens
332 tilting mirror
334 tilting mirror
336 tilt axis
338 tilt axis
348 mirror
650 excitation light source
652 manipulation light source
654 dichroic mirror
656 mirror
658 beam expander
660 light shaping elements
662 lens
664 lens
666 scanner
668 tilt axis
670 light shaping system
760 light shaping element
768 scanner
772 splitting element
773 anamorphic system
774 output merging element
E excitation light
M manipulation light
F fluorescent light
O optical axis
A double arrow
LS light sheet
EP entrance pupil
P1 focal plane
P2 conjugate plane
V virtual tilt axis
d displacement
IP object plane
β angle
f1 focal length
f2 focal length
f3 focal length

The invention claimed is:

1. A light sheet fluorescence microscope, comprising:
a light source configured to emit excitation light suitable for inducing fluorescent light emitted from a specimen;
a detector configured to detect the fluorescent light from the specimen; and an optical system configured to illuminate the specimen with a light sheet formed from the excitation light, and to guide the fluorescent light from the illuminated specimen to the detector, wherein the optical system comprises an objective facing the specimen, the objective being configured to collect the fluorescent light emitted from the specimen, wherein the optical system further comprises a scanning mirror including at least one tilting mirror that is tiltable for reflecting the excitation light to move the light sheet as a whole through the specimen in a light sheet scanning direction transverse to a light propagation direction of the light sheet, wherein the light source is further configured to emit manipulation light suitable for photomanipulating the specimen, and wherein the optical system is further configured to direct the manipulation light through a spatially limited sub-area of an entrance pupil of the objective onto the specimen along a light propagation direction which is different from the light propagation direction of the light sheet.

2. The light sheet fluorescence microscope according to claim 1, wherein the optical system is configured to illuminate the specimen with the light sheet through the objective.

3. The light sheet fluorescence microscope according to claim 1, wherein the spatially limited sub-area is located offset from a center of the entrance pupil of the objective.

4. The light sheet fluorescence microscope according to claim 2, wherein the optical system is configured to direct the excitation light through another spatially limited sub-area of the entrance pupil onto the specimen, the other sub-area being located offset from the sub-area through which the manipulation light is directed onto the specimen.

5. The light sheet fluorescence microscope according to claim 1, wherein the light propagation direction of the manipulation light emanating from the objective towards the specimen has an angle relative to a direction opposite to a light propagation direction of the fluorescent light emitted by the specimen in an angular range from 0 to ±45°.

6. The light sheet fluorescence microscope according to claim 1, wherein the at least one tilting mirror is tiltable for reflecting both the excitation light and the manipulation light.

7. The light sheet fluorescence microscope according to claim 1, wherein the scanning mirror comprises a scanning lens and one single tilting mirror which is located in a rear focal plane of the scanning lens.

8. The light sheet fluorescence microscope according to claim 1, wherein the scanning mirror comprises two tilting mirrors located offset to each other along an optical axis of the optical system.

9. The light sheet fluorescence microscope according to claim 1, wherein the scanning mirror is configured to displace a principal ray of the excitation light in parallel when the excitation light is reflected by the at least one tilting mirror.

10. The light sheet fluorescence microscope according to claim 1, wherein the at least one tilting mirror is tiltable for reflecting the fluorescent light collected by the objective towards the detector.

11. The light sheet fluorescence microscope according to claim 6, further comprising an optical shifting unit configured to shift an incident position of the manipulation light on the at least one tilting mirror so as to vary the light propagation direction of the manipulation light directed onto the specimen independently of the light propagation direction of the fluorescent light or independently of the light propagation direction of the light sheet.

12. The light sheet fluorescence microscope according to claim 11, wherein the optical shifting unit comprises at least one element reflecting or emitting the manipulation light, said the at least one element being movable to shift the incident position of the manipulation light on the at least one tilting mirror.

13. The light sheet fluorescence microscope according to claim 1, wherein the light source is configured to emit the excitation light and the manipulation light along a common optical path into the optical system.

14. The light sheet fluorescence microscope according to claim 13, wherein the light source comprises at least one excitation light source configured to emit the excitation light along at least one first optical path and at least one manipulation light source configured to emit the manipulation light along at least one second optical path, and wherein the light source further comprises a light shaping system having an optical input formed by the first and second optical paths and an optical output formed by the common optical path, the light shaping system being configured to selectively shape at least one of the excitation light and the manipulation light.

15. The light source fluorescence microscope according to claim 14, wherein the light source is switchable between an excitation operating mode for emitting only the excitation light and a manipulation operating mode for emitting only the manipulation light.

16. The light sheet fluorescence microscope according to claim 14, wherein the light shaping system comprises an input merging element configured to merge the first and second optical paths into a third optical path.

17. The light sheet fluorescence microscope according to claim 16, wherein the light shaping system includes a beam expander located in the third optical path.

18. The light sheet fluorescence microscope according to claim 16, wherein:

the common optical path is formed by the third optical path, the light shaping system comprises at least one light shaping element and a scanner which are located in the common optical path, in the excitation operating mode, the light shaping element is configured to not shape the excitation light and the scanner is configured to cause a scanning movement of the excitation light in a predetermined direction transverse to the light propagation direction of the excitation light for generating the light sheet, and in the manipulation operating mode, the light shaping element is configured to shape the manipulation light and the scanner is configured to adjust a displacement of the manipulation light in the predetermined direction.

19. The light sheet fluorescence microscope according to claim 16, wherein:

the light shaping system includes a splitting element located in the third optical path and configured to spatially separate the excitation light and the manipulation light from each other, the excitation light propagating in a fourth optical path and the manipulation light propagating in a fifth optical path, and an output merging element configured to merge the fourth and fifth optical paths in the common optical path, the light shaping system comprises an anamorphic optical element located in the fourth optical path, the anamorphic optical element being configured to generate the light sheet from the excitation light, and the light shaping system comprises at least one light shaping element and/or a scanner located in the fifth optical path , the light shaping optical element being configured to shape the manipulation light and the scanner being configured to adjust a displacement of the manipulation light in a predetermined direction.

20. The light sheet fluorescence microscope according to claim 18, wherein the light shaping element comprises at least one of an electrically tunable lens, a deformable mirror, a digital mirror and a spatial light modulator.

21. The light sheet fluorescence microscope according to claim 18, wherein the light shaping element is configured to shift a focus of the manipulation light in the light propagation direction thereof.

22. A method for imaging a specimen using a light sheet fluorescence microscope, the method comprising:
- emitting excitation light suitable for inducing fluorescent light emitted by the specimen;
- illuminating the specimen with a light sheet formed from the excitation light;
- reflecting the excitation light using a scanning mirror to move the light sheet as a whole through the specimen in a light sheet scanning direction transverse to a light propagation direction of the light sheet,
- collecting the fluorescent light from the illuminated specimen by an objective facing the specimen;
- detecting the fluorescent light;
- emitting manipulation light suitable for photomanipulating the specimen; and
- directing the manipulation light through a spatially limited sub-area of an entrance pupil of the objective onto the specimen along a light propagation direction which is different from the light propagation direction of the light sheet.

* * * * *